United States Patent [19]

Cleland

[11] Patent Number: 4,488,664

[45] Date of Patent: Dec. 18, 1984

[54] BEVERAGE DISPENSING MACHINE

[76] Inventor: Robert K. Cleland, 11051 Via El Mercado, Los Alamitos, Calif. 90720

[21] Appl. No.: 438,051

[22] Filed: Jan. 12, 1983

[51] Int. Cl.³ .............................................. B67D 5/08
[52] U.S. Cl. ....................................... 222/56; 222/66; 222/413
[58] Field of Search ....................... 222/14, 52, 56, 58, 222/63, 64, 66, 129-129.4, 146 R, 146 C, 333, 412, 413, 650, 505, 145; 366/151, 153; 141/94, 95

[56] References Cited

U.S. PATENT DOCUMENTS

| | | | |
|---|---|---|---|
| 3,266,670 | 8/1966 | Brooks et al. | 222/64 X |
| 3,643,835 | 2/1972 | Popinski | 222/56 |
| 4,366,920 | 1/1983 | Greenfield, Jr. et al. | 222/145 |

FOREIGN PATENT DOCUMENTS 2069458   8/1981   United Kingdom ............. 222/129.2

Primary Examiner—H. Grant Skaggs
Assistant Examiner—Michael S. Huppert
Attorney, Agent, or Firm—Georges A. Maxwell

[57] ABSTRACT

An attachment unit removably engaged on the open top of the supply tank of a beverage dispensing machine and operating to mix together metered quantities of powdered beverage concentrate and water and to deliver a resulting beverage into the tank when the liquid level in the tank lowers to a predetermined low level and until the level rises to a predetermined high level. The unit includes a housing with a support flange engaged on the rim of the tank, a concentrate hopper within the housing and having a downwardly opening discharge duct, an auger in the hopper, an electric motor rotating the auger to move concentrate to the duct, a mixing chamber between and communicating with said duct and supply tank, a water service system, an elongate nozzle connected with the system and opening into the chamber, an electrically operated on and off valve and a valving device between and connected with said system and nozzle and controlling the flow of water to and through the nozzle, a liquid level sensing device depending from the housing into the tank and including low and high liquid level responsive switching devices, a control circuit connected with and between said motor, valve and switching devices to energize the motor and actuate the valve open when the low liquid level responsive switching device operates in response to low liquid level in the tank and to deenergize the motor and actuate the valve closed when the high liquid level responsive switching device operates in response to high liquid level in the tank.

18 Claims, 9 Drawing Figures

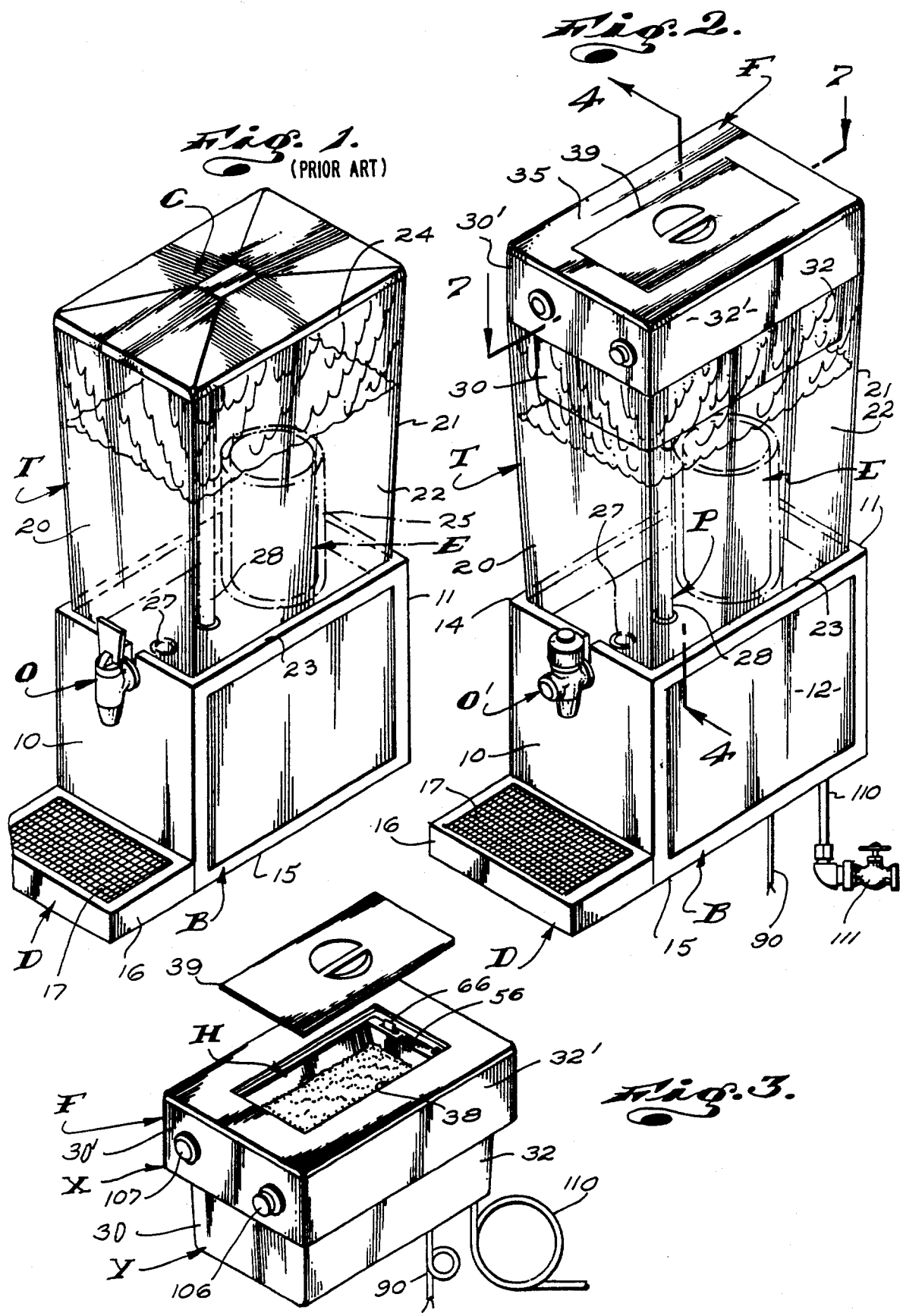

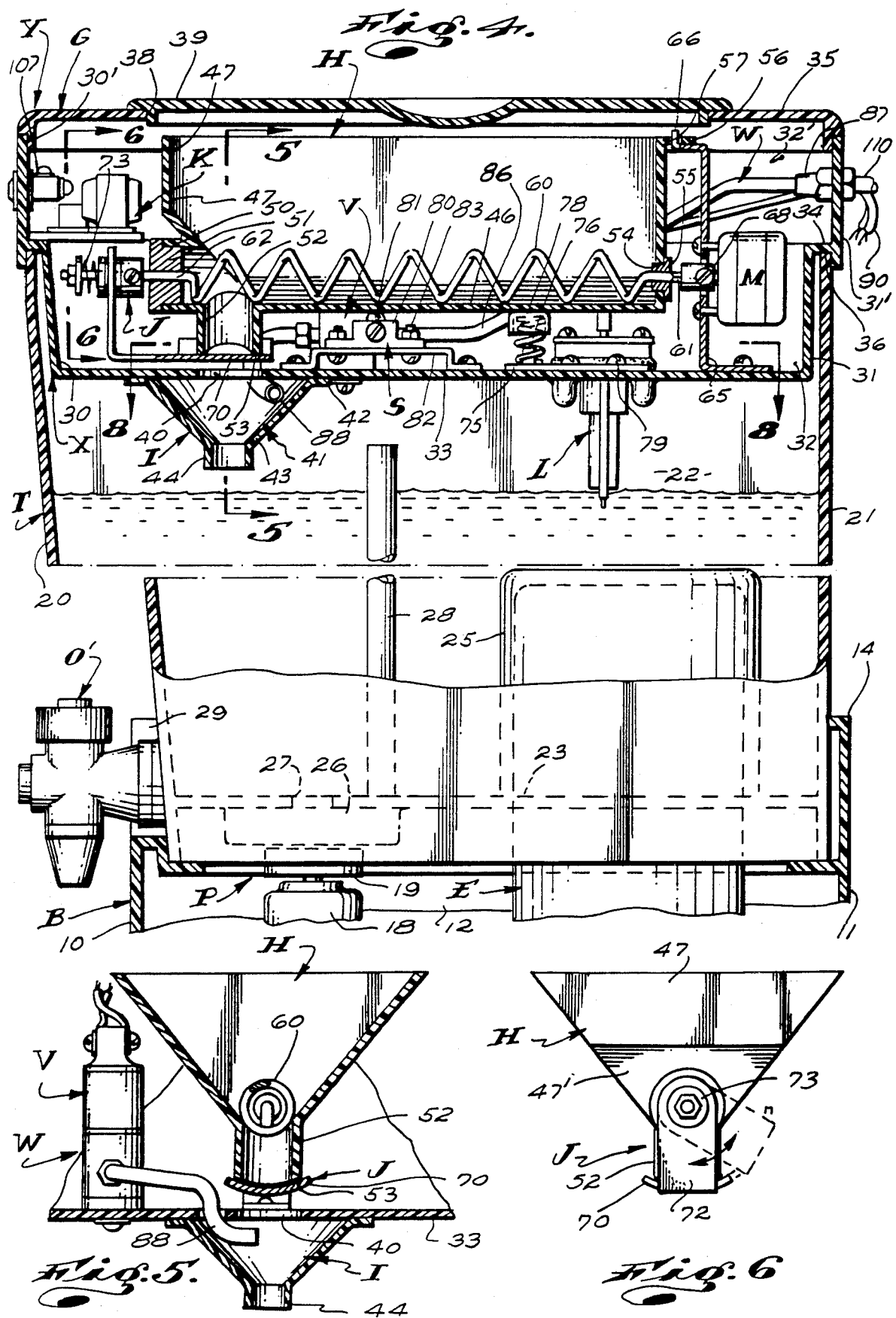

BEVERAGE DISPENSING MACHINE

This invention has to do with beverage dispensing machines and is particularly concerned with an attachment unit applicable to a dispensing machine provided by the prior art to establish an improved beverage dispensing machine.

BACKGROUND OF THE INVENTION

In the art of making and dispensing beverages, there is that common and widely used class of dispensing machine for dispensing non-carbonated fruit punch and the like and which includes a counter-top engaging base and an elongate vertically extending and upwardly opening transparent beverage display and supply tank. The upper end of the tank is normally closed by a removable cover. The base has a front side from which a beverage dispensing valve projects and from which a drip tray projects to support a drinking glass or the like below the valve. Typically, the above class of beverage dispensing machine includes a refrigeration means to cool beverage in the supply tank. The refrigeration means is carried by the base and has an evaporator unit which projects up from the base into a downwardly opening cavity or well formed in the bottom of the tank. Finally, machines of the class referred to in the foregoing include beverage circulating means to maintain beverage in the tanks mixed and in motion. The circulating means typically include pump structures built into the bottoms of the supply tanks and which have impellers with magnetic drive coupling parts. The circulating means next include electric motors with magnetic coupling parts mounted within the bases and in driving relationship with the impellers In operation and use, the beverage to be dispensed by the above noted class of machines is established in portable containers remote from the machines by commingling and mixing together measured volumes of water and beverage concentrates. The pre-mixed beverages are delivered into the supply tanks of the machines by manually removing the covers from the supply tanks of the machines and pouring the pre-mixed beverages into the tanks, at the open tops thereof. Thereafter, the covers are replaced and the machines are let to stand or remain out of service a sufficient period of time to allow the refrigeration means to lower the temperature of the new supplies of beverages to serving temperature. Thereafter, beverages are dispensed through the dispensing valves into awaiting glasses, a serving at a time, until refilling of the tank is required.

While the above procedure is simple, it has been found that in the majority of instances, the pre-mixing of beverages in separate containers and transferring it into the tanks of the machines from which it is to be dispensed, each time refilling is required, is messy, troublesome and repleat with potentially serious health and safety hazards. It has also been found that the down time required to effect refilling of such machines and allowing the beverages in the machines to cool often occurs at most inopportune times and results in many unforeseen problems, including substantial losses in sales.

It has been recognized that it would be most advantageous to provide machines of the class referred to above with means for automatically mixing measured volumes of water and beverage concentrate and delivering resulting beverages directly into the supply tanks of the machines and to provide such means which automatically, intermittently operate to maintain the supply of beverages in their related supply tanks at a high level and substantially full, whereby the practice of mixing full supplies of beverages in separate containers and transferring such beverages into the tanks of such machines is eliminated and so that ample supplies of chilled beverages remain in the supply tanks at all times to effectively chill those small volumes of beverages that are intermittently added thereto.

To the above end, the prior art has provided many different kinds and forms of automatic beverage supply and/or mixing means for beverage dispensing machines of the character referred to. Most of those automatic beverage supply and mixing means provided by the prior art have consisted of a multiplicity of elements and/or parts which must be built into their related beverage dispensing means in what might best be described as a make-shift plumbing job. They must be built into their related machines at the time of manufacturing the machines or, if related to existing machines, the machines must be rebuilt or modified to such an extent that their structural and/or aesthetic integrity is often adversely affected.

To date, the only automatic beverage supply and mixing means for beverage dispensing machines of the character referred to above which have proven to be satisfactory and practical have been those means which are specially designed to handle, dispense and mix liquid beverage concentrates and water. Such machines have proven satisfactory simply because liquid concentrates are quite easy to store, transport and dispense in metered volumes. For example, supplies of such concentrate can be located remote from their related machines, can be conducted to the machines through small, flexible tubes and the like and can be easily dispensed in metered volumes and mixed with metered volumes of water by means of simple aspirator devices arranged in the tanks of the machines. Such aspirator devices can be connected with suitable pressurized water service systems by flexible tubes extending from the machines. Accordingly, such means only require that the aspirator devices be related directly to the tanks of the machines and only two small tubes need extend from those devices to remote concentrate and water supplies.

In practice, while liquid beverage concentrates are quite common, dry, powdered or granulated beverage concentrates are also quite common and their use is preferred by many vendors of beverages.

Providing automatic beverage concentrate supply and mixing means for beverage dispensing machines of the here concerned with, which are capable of handling dry, or granulated beverage concentrates, is made extremely difficult by the hygroscopic nature of such concentrates and their tendency to become moist, sticky, gummy and incapable of being effectively worked with when exposed to a source of moisture. As a result of the foregoing, to the best of my knowledge and belief, all attempts by those in the prior art to provide automatic beverage mixing means for beverage dispensing means of the class here concerned with, which are capable of handling powdered or granulated beverage concentrates, have proven to be deficient and wanting to such an extent that none has proven to be functionally and/or economically practical to use and none has attained any notable commercial success.

Exceptions to the above are those small coffee, tea and cocoa machines which operate to mix and dispense their beverages, a serving at a time. Such special machines do not maintain large supplies or volumes of beverage in tanks, chilled and ready to be dispensed. In such machines, water is intermittently dispensed and handled by the machines in such a manner that any or most residual moisture, which might adversely affect the supplies of dry, powdered or granulated beverage concentrates is effectively exhausted from the machines.

In the case of beverage dispensing machines of the class here concerned with, if an automatic beverage concentrate supply and mixing means, suitable for storing, dispensing and mixing dry powder concentrate with water and for delivering the beverage thus made into the supply tank of the machine is to be provided, it must be related to the open top of the supply tank of the machine and must be sufficiently large to accommodate and carry an adequate supply of concentrate for practical use. Further, such means, to be effective and practical, must be such that the supply of dry powder or granulated beverage concentrate is suitably protected against the intrusion of moisture which would result in its degradation. Accordingly, it would be reasonable to assume that such a means, when related to the open top of the supply tank of such a machine, would be a large, bulky and unsightly structure towering above the top of the supply tank.

OBJECTS AND FEATURES OF THE INVENTION

It is an object of my invention to provide a neat, compact, effective and economical to make, use and maintain attachment unit for that class of beverage dispensing machines which are characterized by elongate, vertical beverage supply tanks projecting upwardly from counter supported bases, which attachment unit operates to automatically maintain the supply of beverage in the supply tank with which it is related, above a predetermined low level.

It is another object of this invention to provide an attachment unit for the purpose set forth above which is specially designed and constructed to intermittently operate and mix together measured volumes of water and dry, powdered or granulated beverage concentrate and to deliver beverage established thereby into the supply tank of its related beverage dispensing machine.

Another object and feature of my invention is to provide an attachment unit which is removably engageable with the open top of the supply tank of its related dispensing machine, in place of a standard cover for said tank and which has upper and lower portions of limited vertical extent projecting up from and down into the open top of the tank, whereby the cumulative vertical extent of the attachment unit is substantial while only a limited portion thereof occurs outside of and projects up from the tank, thus providing a unit which does not appear to be a large, bulky and aesthetically unpleasant addition to its related dispensing machine.

Another object and feature of my invention is to provide an attachment unit of the character referred to having an improved and novel dispensing means for receiving, holding and intermittently dispensing measured volumes of powdered or granulated beverage concentrate.

A further object and feature of the invention is to provide dispensing means for dispensing dry, powdered or granulated beverage concentrate which includes an elongate, horizontally extending, vertically opening concentrate holding hopper with an outlet opening at one end and an elongate motor driven auger within the lower portion of the hopper and operating to advance concentrate longitudinally thereof to said outlet opening when it is rotated.

A further object and feature of the invention is to provide a dispensing means of the general character referred to having novel gate means related to the outlet opening and to the auger to normally overlie and close the opening and which is moved from engagement with the opening by the auger, when said auger is rotated.

Still another object and feature of my invention is to provide novel dispensing means of the general character referred to with improved mounting means releasably pivotally mounting the hopper at one of its ends, novel coupling means releasably coupling the auger with the output shaft of a drive motor, novel spring means engageable with the hopper to counter the weight of concentrate therein and to pivotally move the hopper when the supply of concentrate therein is exhausted, and novel switching means related to the hopper and operating to put the unit out of service when the supply of concentrate is exhausted and the hopper is moved by said spring means.

Yet another object of this invention is to provide a novel unitary attachment of the general character referred to above which includes a novel mixing means to receive concentrate dispensed from the hopper and novel water supply means to deliver predetermined volumes of water into the mixing means as said concentrate is deposited therein and a mixing means which communicates directly with the supply tank of its related dispensing machine to discharge beverage therein.

It is an object and feature of the present invention to provide the attachment unit with fluid level sensing means responsive to the level of beverage in the supply tank of its related dispensing machine and a control circuit related to the fluid level sensing means, drive motor for the auger, an electrically operated valve of the water supply means and to said novel switching means whereby the attachment unit operates to make and deliver beverage into the supply tank when the liquid level in said tank lowers to a predetermined low level and until the liquid level in the tank raises to a predetermined high level, whereupon the attachment unit discontinues to deliver beverage into the supply tank until the liquid level therein once again lowers to said predetermined low level.

Finally, it is an object and feature of my invention to provide an attachment unit of the general character referred to which is such that the hopper can be easily and quickly manually moved into and out of working engagement with its related parts and structure, whereby cleaning and servicing the hopper and the parts and structure normally related with it is made simple, quick and convenient to perform.

The foregoing and other objects and features of my invention will be fully understood from the following detailed description of one typical preferred form and application of my invention, throughout which description reference is made to the accompanying drawings:

DESCRIPTION OF THE DRAWINGS

FIG. 1 is an isometric view of a beverage dispensing machine provided by the prior art and with which my new attachment unit can be related;

FIG. 2 is a view of the machine shown in FIG. 1 with my attachment unit related to it;

FIG. 3 is an isometric view of the attachment unit separate from the machine;

FIG. 4 is an enlarged sectional view taken substantially as indicated by line 4—4 on FIG. 2;

FIG. 5 is a sectional view taken substantially as indicated by line 5—5 on FIG. 4;

FIG. 6 is a view taken as indicated by line 6—6 on FIG. 4;

DETAILED DESCRIPTION OF THE INVENTION

Figure 7:
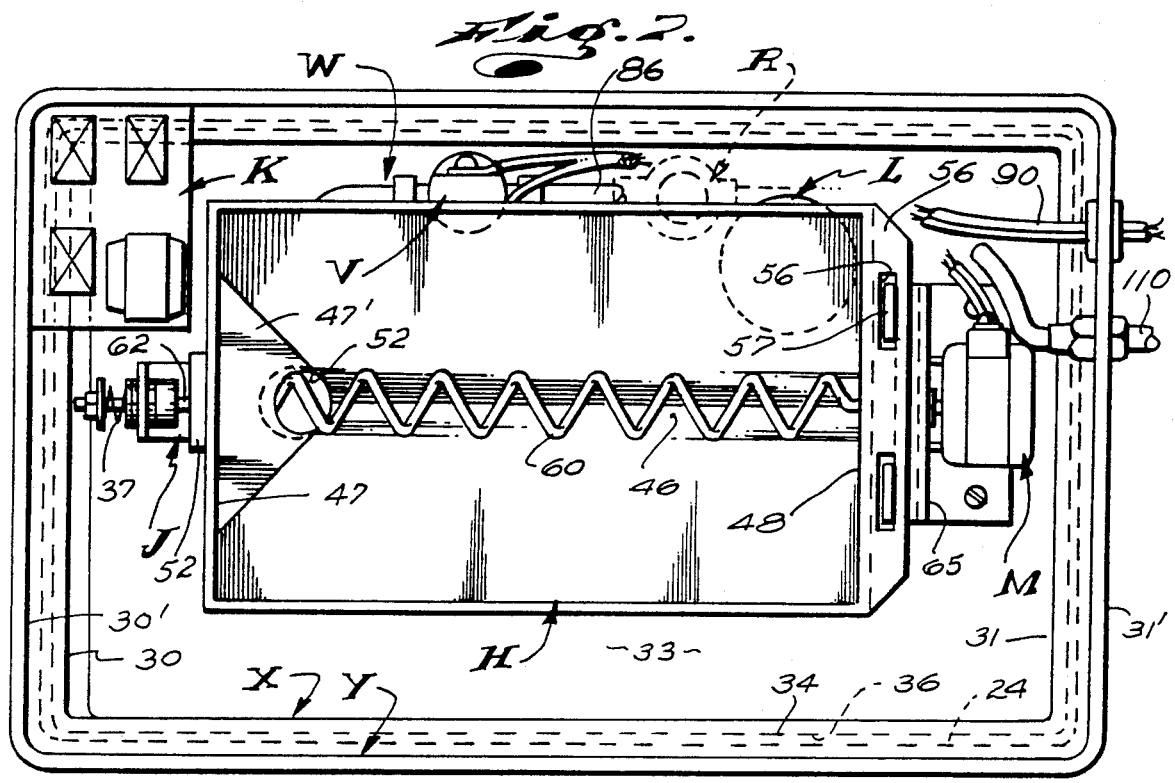
FIG. 7 is an enlarged sectional view taken as indicated by line 7—7 on FIG. 2.
Figure 8:
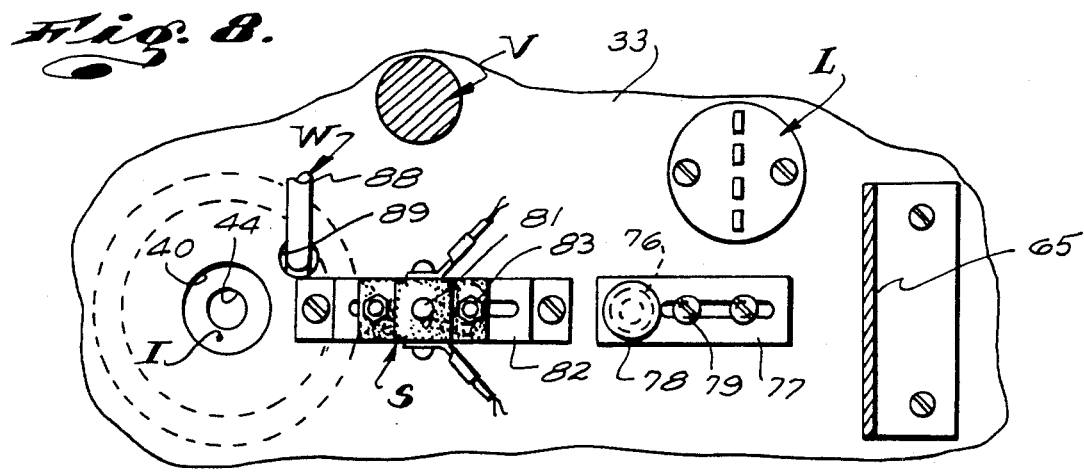
FIG. 8 is a view taken substantially as indicated by line 8—8 on FIG. 4.

In FIG. 1 of the drawings, I have illustrated a noncarbonated beverage dispensing machine A. The machine A is typical of those machines which have been produced by the prior art for many years and which are in extensive use throughout the world. While details of construction and design of different makes and models of such machines vary, they are similar in basic design and in many details of construction. Many of the similarities which exist between different makes and models of such machines are a result of the fact that many manufacturers of such machines have copied competitors' machines and have sought to make parts of their machines interchangeable with parts of the machines of competitors so that they can sell their parts as replacement parts in competitors' machines and can also look to the in-house and/or distributed supplies of their competitors' replacement parts to manufacture and/or repair their machines.

The machine A includes a rectangular box-like base B adapted to be set atop a counter or the like; a beverage supply tank T carried by and projecting up from the base B, a dispensing valve O projecting from the tank T, adjacent the top of the base B; and a drip tray D projecting from the lower portion of the base B, in spaced relationship below the valve O.

The base B is an elongate vertically extending fabricated box-like unit with vertical front, rear and side walls 10, 11 and 12, a horizontal top 14, and a bottom 15. The drip tray D is shown as a fabricated upwardly opening box-like receptacle 16 secured to and projecting from the front wall 10 at the lower edge thereof and is provided with a drinking glass supporting screen 17 overlying its open top.

In accordance with common practice, the bottom 15 of the base is closed by a louvered panel (not shown) which panel is provided with suitable spaced rubber button-like pads (not shown).

In most machines, the bases house refrigeration means to cool beverage in the supply tanks. The refrigeration means generally include elongate evaporator units which project upwardly from the tops 14 of the bases and into downwardly opening recesses or wells formed in the bottoms of the tanks and as shown at E in the drawings.

The top 14 of the base B is recessed to cooperatively receive and hold the lower end of the tank T.

In addition to the above, the base B carries an electric motor 18 with a magnetic drive coupling part 19. The drive part 19 drives the impeller of a beverage circulating pump means P at the lower end of the tank T.

The tank T is an elongate vertical unitary part molded of a suitable transparent plastic material and is characterized by vertical front, rear and side walls 20, 21 and 22, a bottom wall 23 and an open top 24. The lower end of the tank is nestingly set in the recessed top 14 of the base B, as shown.

The bottom wall 23 of the tank is formed with an upwardly projecting downwardly opening well 25 in which the evaporator unit E of the refrigeration means is slidably entered and is formed with a pump housing 26 which occurs above the drive coupling part 19 within the base B and in which an impeller (not shown) with a magnetic coupling part is rotatably engaged. The pump housing has a fluid inlet port 27 opening at the bottom of the tank and an outlet opening in which the lower end of a stand pipe 28 is engaged. The stand pipe 28 projects upwardly in the tank to discharge fluid or beverage delivered by the pump means into the upper end of the tank. The liquid discharge by the stand-pipe impinges upon that structure which is provided to overlie the open top of the tank and is deflected by that structure so that it cascades down the vertical walls of the tank in an appealing manner.

The pump housing 26, impeller, opening 27, standpipe 28 and the motor 18 with its coupling part 19, establish the referred to beverage recirculating pump means P.

The dispensing valve O, shown in FIG. 1 of the drawings, is a manually operable on and off valve mounted on and projecting forwardly from the lower end of the front wall 20 of the tank. The inlet side of the valve O communicates with the interior of the tank adjacent the bottom wall 23 thereof and, in the case illustrated, projects freely through and forwardly from an upwardly and forwardly opening notch 29 in the front wall 10 of the base B.

In FIG. 2 of the drawings, the valve O' is shown as an electrically operated valve such as is now commonly provided in machines of the character here concerned with. Such electric valves operate to open upon pushing of a button at the front sides thereof and are adjustable to remain open for those periods of time to effect the dispensing of predetermined measured servings of beverage.

It is to be understood that the valve O and O' are both standard equipment and that either can be used in the machine with which my new attachment unit is related without in any way affecting the novelty of my invention.

The basic machine A illustrated in the drawings next and finally includes a cover C and removably engaged with and overlying the open top 24 of the tank T.

In use, when the supply of beverage in the tank T is depleted and the liquid level is lowered to an extent that a substantial volume of new beverage can be added to bring the level of beverage to near the open top of the tank, a suitable volume of new beverage is made in a separate pail or container by mixing measured volumes of beverage concentrate and water together. The cover C is removed from the tank and the newly mixed beverage is manually poured from the pail or container into the open top of the tank. The cover C is then replaced.

The tank T is made transparent and the beverage recirculating pump P is provided so that the beverage in and to be dispensed from the machine is visible and effectively displaced to potential purchasers.

The machine A illustrated and described above does not and is not intended to illustrate and describe any particular prior art beverage dispensing machine but rather, is intended to show the basic combination and relationship of parts which characterizes most prior art vending machines of the class here concerned with.

The above and all other aesthetic features of such machines have developed over a period of many years and are exceedingly important since they display the beverage vended in a very effective and unique manner and in a manner to which the public has become accustomed and find most agreeable or acceptable.

In furtherance of my invention and to provide for automatically maintaining the supply of beverage in the tank T of the machine A between predetermined high and low levels and to eliminate the necessity of manually mixing and pouring new beverage into the tank, to replenish the supply of beverage therein (as noted in the preceding, I provide a new and novel attachment unit F which operates to automatically mix together dry granulated or powdered beverage concentrate and water in those predetermined proportions necessary to establish a vendable beverage and which delivers that beverage directly into the tank T of the machine A.

The attachment F is a unitary structure which is removably engageable over and with the open top of the tank T of the machine A, in place of the original cover C (shown in FIG. 1 of the drawings) and as clearly illustrated in FIGS. 2 and 4 of the drawings). The attachment F includes a box-like housing G with lower and upper portions X and Y. The lower portion X of the housing is defined by substantially vertical front, rear and side walls 30, 31 and 32, a substantially horizontal bottom wall 33 and an outwardly projecting horizontal support flange 34 about the upper perimeter of said lower portion defined by the walls 30, 31 and 32. The lower portion X opens up into the upper portion Y. The upper portion Y is defined by vertical front, rear and side walls 30', 31' and 32' which join and project upwardly from the outer perimeter of the flange 34. The upper end of the upper portion Y is closed by a substantially horizontal top wall 35 which wall is preferably removable to enable desired access into the interior of the housing and to facilitate manufacture of said housing.

The lower edge portions of the front, rear and side walls 30', 31' and 32' of the upper portion Y depend below the flange 34 and cooperate with that flange and with the walls 30, 31 and 32 to define a downwardly opening channel 36 which corresponds in plan configuration with the upper rim portion of the tank T and is of a size to freely receive the rim portion of the tank with its top edge in stopped supporting engagement with the flange 34, as clearly illustrated in the drawings.

With the above construction, it will be apparent that the lower portion X of the housing G enters and depends freely into the upper portion of the tank, the tank supports the housing about its central flange 34 and the upper portion Y of the housing projects up from the top of the tank.

It is significant and important to note that the vertical extent of the lower portion X of the housing is limited and not so great that it depends down and into the tank T a sufficient distance to adversely affect or limit the high liquid level in or holding capacity of the tank. The vertical extent of the upper portion Y of the case is limited and is not so great that it adversely unbalances the aesthetics of the machine A or such that the top of the attachment is positioned so high that it is out of convenient reach of those who must operate and service the machine and the attachment unit. The cumulative vertical extent of the lower and upper portions X and Y is substantial and the housing defines a chamber or compartment of substantial vertical extent and volume.

The removable top wall 35 of the housing G is provided with an elongate central access opening 38 extending longitudinally thereof with respect to its front and rear ends. The access opening is normally closed by a manually engageable removable lid or cover 39.

The bottom wall 33 of the housing is provided with a vertical transfer port 40 at its forward end portion. The port 40 opens into the upper end of a mixing chamber I below the forward end of the housing. The chamber I is defined by a conical funnel 41 fastened or fixed to the lower surface of the bottom wall 33, as clearly shown in FIG. 4 of the drawings. The funnel 41 has an upper horizontal flange 42 abutting the bottom wall 33, a downwardly and radially inwardly convergent side wall 43 and a central depending tubular discharge spout or neck 44.

An elongate upwardly opening dry powdered or granulated beverage concentrate holding hopper H is positioned in the housing G to extend longitudinally thereof beneath the access opening 38 in the top wall 35. The hopper H has substantially flat downwardly and laterally inwardly convergent longitudinally extending side walls 45 joined at their lower edges by a semi-circular bottom wall 46. The ends of the hopper are closed by vertical front and rear end walls 47 and 48. The lower portion 47' of the front wall 47 is inclined downwardly and rearwardly and is formed with a forwardly projecting cylindrical tubular extension 50 concentric and corresponding in inside diameter with the inside diameter of the bottom wall 46. The forward open end of the extension 50 is normally closed by a plug-like bearing block 51 press-fitted therein.

The forward end of the hopper is next provided or formed with a vertically extending vertically opening cylindrical concentrate discharge duct 52 which opens at the rear end of the extension 50 and is in vertical spaced relationship above and in alignment with the transfer port 40 in the bottom wall 33 of the housing. The lower open end 53 of the discharge duct 52 is curved on a radius concentric with the central axis of the bottom wall 46 and the extension 50.

The rear wall of the hopper H is provided with a lower opening 54 concentric with the axis of the bottom wall and the extension 50 and in which a bearing 55 is engaged. The rear wall 48 is further provided with a rearwardly projecting horizontal mounting flange 56 at its upper edge. The flange 56 is provided with two or more laterally extending vertically opening slots 57.

The hopper H next includes an elongate helical auger 60 formed of metal rod or wire stock. The hopper 60 is positioned in and extends longitudinally of the hopper, within and concentric with the bottom wall thereof and extends into the extension 50, above the upper open end of the duct 52. The rear end of the auger is formed with a central axially extending drive shaft 61 which extends through the bearing 55 and rearwardly from the rear wall 48 of the hopper. The rear terminal end of the shaft 61 is polygonal in cross-section. The forward end of the auger 60 is formed with an elongate, axially extending drive shaft 62 which extends through and forwardly from the bearing block 51 which is engaged in and closes the forward end of the extension 50.

The rear end of the hopper H is pivotally supported by a mounting bracket 65 fixed to and projecting up from the bottom wall 33 of the housing. The bracket 65 has laterally spaced forwardly projecting and upwardly turned tabs or dogs at its upper end which underlie and support the rear flange 56 on the hopper and which project up through the slots 57 in the flange 56. The bracket thus pivotally supports the hopper about a transverse axis at the upper rear end thereof.

The bracket supports and carries an electric drive motor M with a forwardly projecting drive shaft. The drive shaft carries a polygonal drive socket 68 which slidably receives and releasably establishes driving engagement with the polygonal rear end of the driven shaft 61 of the auger 60.

The noted mounting bracket pivotally supports the hopper H so that it can normally occur within the chamber defined by the housing in substantially parallel vertical spaced relationship above the bottom wall 33, below the top wall 35 and with the shaft 61 concentric with and in driving engagement in the socket 68.

It will be apparent that upon manual engagement and upwardly pivotal movement of the front end of the hopper H, about its pivotal axis, the lower rear end of the hopper pivots forwardly and upwardly to draw the input shaft 61 from engagement in the socket 68 and that upon disengagement of that shaft from said socket, the hopper is free to be manually lifted from engagement with the mounting bracket and out of the housing, through the opening 38 in the top wall 35. Such removal of the hopper might be required from time to time for cleaning and servicing the hopper and other elements and parts of the attachment unit.

The hopper H is next provided with gate means J to normally close the lower open end 53 of the discharge tube or duct 52. The gate means can vary widely in details of construction but preferably includes a plate 70 which normally underlies the lower open end of the duct 52 in close substantial sealing relationship therewith and which is driven out of engagement from beneath the duct when the motor M is energized and the auger 60 of the hopper H is rotated.

In the case illustrated, the gate means includes a sheet metal plate 70 curved concentric with the axis of the auger and the lower end 53 of the duct and which is normally positioned beneath the duct in substantial sealing engagement therewith. The plate 70 is carried by an integrally formed forwardly and thence upwardly extending pivot arm 72. The arm 72 is apertured to freely receive and is carried by the forward end of the output shaft 62 of the auger 60. The shaft 62 carries clutch means 73 to frictionally engage the arm 72 to pivot the arm and the plate 70 laterally or circumferentially out of engagement below the duct 52 when the auger is rotated. The clutch means is shown as including a drive block or plate secured to the shaft 62 rearward of the arm, a pair of clutch plates on the shaft forward of the arm, a helical compression spring forward of and engaging the clutch plates and an adjustable nut on the shaft forward of the spring. The spring is adjusted so that insufficient friction is established by the clutch means to prevent the weight of the gate to move or swing it down (as a pendulum) into its normal closed position when the auger is not rotating, but establishes sufficient friction so that when the auger and the shaft 62 rotate, the gate is pivotally moved laterally from engagement beneath the duct 52.

The gate means J effectively serves to normally block the upward movement of moisture-ladened air through the duct 52 and into the beverage concentrate in the hopper.

The attachment unit that I provide next includes novel weight responsive support means 75 between the bottom wall of the hopper and the bottom wall of the housing. The means 75 is spaced forward from the rear end of the hopper and normally yieldingly urges the forward end of the hopper upwardly. The support means 75 is such that the upward force exerted thereby is less than the combined weight of the hopper acting upon it and the weight of a supply of concentrate in the forward end of the hopper and within the extension 50 which is sufficient to sustain operation of the attachment unit to mix and dispense beverage. The force exerted by the means 75 is, however, sufficient to pivot the hopper H upwardly, about its pivotal axis, when the weight of the supply of beverage in the hopper is depleted to an extent that operation of the attachment unit to mix and deliver beverage cannot be sustained.

The means 75 includes a vertically extending helical compression spring 76, carried by and projecting upwardly from a plate 77 supported by the bottom wall 33 of the housing. The upper end of the spring is provided with a cap 78 which engages the bottom wall 46 of the hopper. The plate 77 extends longitudinally of the hopper in spaced relationship therebelow and has one or two longitudinally extending fastener receiving slots formed therein. The plate is releasably secured to the bottom wall 33 of the housing in set position by a pair of longitudinally spaced screw fasteners 79 engaged through the slot or slots therein. With this construction, by releasing the fasteners 79, the plate 77 and spring 76 can be moved axially of the hopper to adjust the lever arm effect or mechanical advantage of the hopper on the spring and to thereby adjust the support or spring means so that the hopper will move in advance thereof, when desired. Such adjustment of the support means 75 is necessary when the weight per cubic measure of the concentrate being handled is changed to any appreciable extent.

The attachment unit that I provide next includes a master control switching means S which operates to open an electric circuit for the attachment unit and to stop or prevent operation thereof when the supply of concentrate has been exhausted or depleted to an extent that operation of the attachment unit cannot continue.

The switching means S includes a normally open micro switch 80 mounted on the bottom wall 33 of the housing below the hopper H. The switch can be positioned rearward of but is preferably positioned forward of the spring or support means 75 and has an upwardly projecting spring loaded actuating member or button 81 normally engaging the bottom wall 46 of the hopper, as clearly shown in FIG. 4 of the drawings. The weight of the hopper, plus the weight of a usable supply of concentrate therein is sufficient to overcome the work force of the means 75 and of the spring load on the actuating member 81 of the switch 80 to yieldingly urge and to maintain the switch 80 closed. The switch is connected in the circuit supplying power to the motor M and is such that when the supply of concentrate in the hopper is exhausted or depleted and the hopper pivots up, the switch 80 opens, disabling or putting the motor M out of service.

The switch 80 is carried by a slotted bracket 82 fastened to the bottom wall 46 of the housing and is secured thereto in adjusted and set position longitudinally of the hopper by screw fasteners 83. Thus, the longitudinal positioning of the switch 80, relative to the hopper H, can be adjusted to augment or supplement the adjustment which is afforded by longitudinal movement and positioning of the means 75, as noted above.

It will be apparent that the switching means S need not be precisely as shown but can be varied substantially without departing from the spirit of my invention. For example, the switch 80 could be mounted on the bracket for the motor M with its actuating member 81 projecting forwardly and normally engaged and held in its actuated or closed position by the rear wall 48 of the hopper. Alternatively, the switch 80 can be a normally closed switch mounted in the forward portion of the casing with its actuating member engaging the upper forward edge of the hopper, the top of the extension 50 thereof, or the forward end of the shaft, 62 or auger, without departing from the broader aspects and spirit of my invention.

The attachment unit next includes water supply means W to deliver water into the mixing chamber I, when the motor M is energized and the auger 60 rotates and advances concentrate through the duct 52 and into the mixing chamber I. The means W includes a normally closed solenoid actuated valve V mounted within the housing. The upstream side of the valve connects with the downstream end of a water supply line 86 which extends rearwardly in the housing and line 86 which extends rearwardly in the housing and out through an opening in the rear wall 31' thereof. The rear end of the line 86 is provided with a coupling means 87 to connect the line 86 with a water supply hose or line 110 extending from the machine to a common pressurized water service outlet valve 111 in the facility or establishment in which the machine A is used.

The downstream side of the valve V is connected with the upstream end of a nozzle tube 88 which extends down through an opening 89 in the bottom wall 33 adjacent the port 40 therein and into the mixing chamber, at one side thereof. The outlet end of the tube 88 is disposed circumferentially in the chamber at the upper end portion thereof and in the direction of normal vortex flow within the chamber.

The solenoid valve, like the motor H, is under control of the switching means S so that when the supply of concentrate is exhausted and the hopper is moved to open the switch means S, the water supply means is put out of service. Accordingly, a continuing flow of water into the supply tank T, which would dilute the beverage remaining therein, is prevented.

The attachment unit that I provide next includes liquid level sensing means L and a control circuit K which normally cyclically operate to energize the valve V of the means W and the motor M for the hopper H when the level of the beverage in the tank T drops to a predetermined low level and to maintain the valve and motor energized until the level of the beverage in the tank reaches a predetermined high level.

The liquid level sensing means L can be in the form of a float actuating switching device or, as shown, can be in the form of a resistive probe, with spaced apart pairs of electrodes which depend into the tank T. The lower ends of one pair of electrodes terminates at the lower liquid level in the tank and the lower end of at least one electrode of the other pair of electrodes terminate at the high liquid level in the tank. The beverage in the tank is a conductor and serves as a switching gate between the ends of the pairs of electrodes. With this form of liquid level sensing means, when the liquid level drops below the lower ends of the first or lowermost set of electrodes, the circuit therebetween is open and when the liquid level rises in the tank to contact the lower ends of the upper set of electrodes, it closes the circuit therebetween. Accordingly, the two pairs of electrodes cooperate with the liquid in the tank T to establish liquid level responsive normally closed and normally open switches. The lowermost switch which is normally closed is a recycling or cycle starting switch and the other or upper normally open switch is a cycle stopping or stop switch.

In practice, one of the electrodes of each of the noted switches can be established by a common electrode with the result that three electrodes function to establish the noted pair of switches.

It is to be noted that the form of liquid level sensing means illustrated and described above is old in the art and is the full mechanical equivalent of those float actuated switching devices and means which have long been provided to effect control of electrical circuits in response to the level of liquids being worked upon and which are well known to all of those who are familiar with or skilled in the art to which my invention relates.

Figure 9:
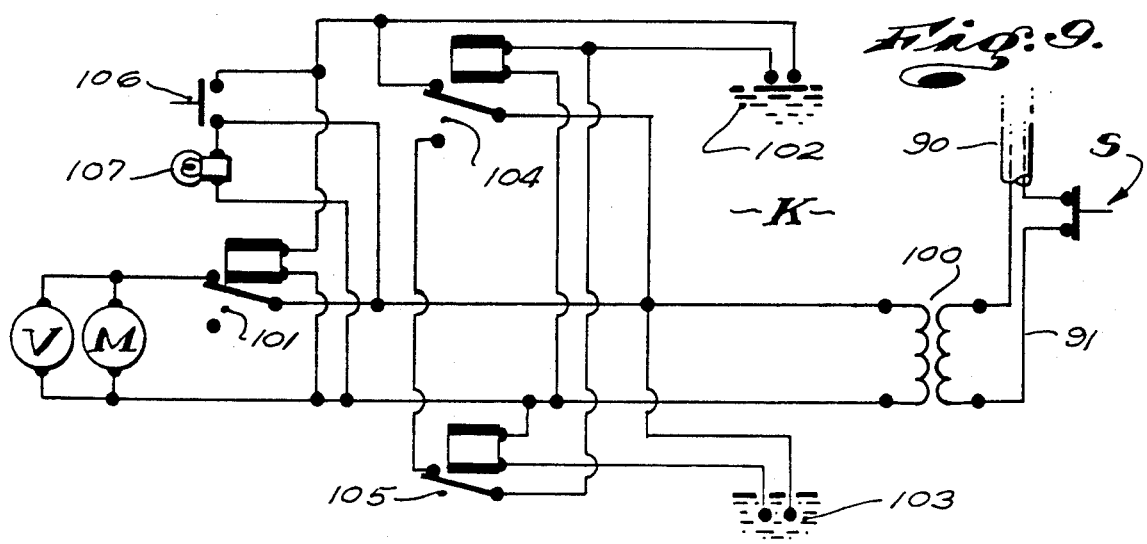
FIG. 9 is a diagrammatic view of the electric circuit of the invention.

The control circuit K that I provide is a simple circuit supplied with current by a service cord 90 entering the housing G through an opening in the rear wall 31' thereof. The control switch S which is normally held closed by the hopper H is engaged in one conductor or line 91 of the cord 90. The circuit K, diagrammatically illustrated in FIG. 9 of the drawings, includes a transformer 100 connected with the cord 90 and under control of the switch S. The circuit K further includes a normally open primary relay switch 101 between and connected with the transformer 100 and the valve V and motor M. The circuit next includes a pair of switches 102 and 103 (the switching means of the liquid level sensing device L). The switch 102 is a normally open high liquid level shut-off switch and the switch 103 is a normally closed low level recycling switch. The circuit next includes a second shut-off or control relay switch 104 connected with the switch 102, the primary relay 101 and with a third, recycling relay switch 105. The relay 105 is connected with the switch 103 and with the relay 104. The circuit shown is such that when the switch S is closed, the circuit is energized. Assuming that the circuit is in its filling mode of operation, that is, it is in that condition where the relay 101 is closed and the valve V and motor M are energized to effect the delivery of water and concentrate into the mixing chamber I and the delivery of beverage into the tank T; the circuit will remain in such mode of operation until the liquid level in the tank T closes switch 102. When switch 102 closes, relay 104 switches from its actuated closed position to its normal open position and relay 101 is switched from its actuated closed position to its normal open position. Thereafter, the circuit is de-activated or put into a standby mode where the valve V and motor M are de-energized. During the standby mode, the switch 103 is closed and the relay 105 under control of that switch is in an actuated closed position. The relay 105 is connected with relay 104 so that it maintains relay 104 in its actuated open position. During standby, beverage in the tank is dispensed in due course.

After beverage in the tank T has been dispensed, a serving at a time, to lower the liquid level in the tank to below the switch 103, switch 103 opens and the relay 105 is de-energized or operates to its open position. Upon opening of the relay 105, relay 104 is de-energized and returns to its normal closed position, thus putting the circuit back into its filling cycle. The circuit will remain in its filling cycle or mode of operation until the tank T is filled to its high liquid level and switch 102 is again closed.

In practice, since it may be desired to fill the tank T before the supply of beverage therein is lowered to its low level, I provide a manually engageable button switch 106 in the front wall 30' of the housing. The switch 106 is connected in the circuit K to actuate relay 101 to its closed position, whereby a person can, by manually closing switch 106, cause the attachment to make and deliver beverage into the tank T, independent of the remainder of the circuit K. In practice, if desired, the switch 106 can be a normally closed switch connected in one of the operating current conductors between the relays 104 and 105, or in the line between relay 104 and switch 103. In such a modification of the circuit, upon manual actuation of the switch 106, the circuit is put into its filling mode (prior to opening of the switch 103).

Further, a signal lamp 107 can be and is shown mounted in the front wall 30' of the housing. The lamp 107 is connected in and with the circuit K so that when the attachment unit is in service and operating, the lamp is energized. The lamp remains energized and on or until the supply of concentrate is exhausted and requires replenishment. The lamp can be connected so that it is normally off and turned on when the supply of concentrate needs replenishment, without departing from the broader aspects and spirit of my invention.

In practice, if desired, and as shown at R in dotted lines, a pressure regulator can be engaged in the water supply means W within the housing G if the pressurized water service system with which the attachment unit A is connected is subject to notable pressure changes. Since few modern water service systems are subject to any appreciable pressure changes, including a pressure regulator is normally not required. When provided, the regulator is set to control the rate of flow of water into the chamber I.

Ordinarily, the rate and volume of the flow of water into and through the mixing means I is adjusted relative to the rate at which the hopper discharges beverage concentrate into the mixing means, when the auger is rotated, to establish a desired proportional mix of concentrate and water. Adjustment of the flow rate and volume of water delivered into the mixing means I by the means W is effectively adjusted and set at and by the hose bib or service valve which is normally a part of a related water service system and with which the water supply means W is connected by means of the above noted service hose 110. Since the hose bib or valve of the water service system with which my attachment unit is connected performs an important function and is a necessary element or part of my invention, I have, in FIG. 2 of the drawings, shown the water supply hose 110 depending from the rear of the beverage dispensing machine and connected with the faucet or service valve 111 of a water service system. The valve 111, though remote from the attachment unit, is a manually adjustable flow control valving means and is a necessary element or part of the water supply means W.

In those instances where a pressure regulator is required, the regulator is set to control the rate and volume of water that flows into the chamber I when the valve V is open and the service valve 111 is not required to perform any function during normal operation of the attachment unit.

From the foregoing, it will be apparent that the attachment unit that I provide is a simple, neat and compact unit which operates to automatically mix dry, powdered or granulated beverage concentrate and water to make and deliver beverage directly into the supply tank of its related beverage dispensing machine, in response to changes in the level of beverage in the supply tank between predetermined high and low levels therein. The attachment unit that I provide is such that when it is related to and used in combination with a common beverage dispensing machine, the combination constitutes a new and improved beverage dispensing machine.

Having illustrated and described only one typical preferred form and embodiment of my invention, I do not wish to be limited to the specific details herein set forth, but wish to reserve to myself any modifications and/or variations that might appear to those skilled in the art and which fall within the scope of the following claims:

Having described my invention, I claim:

1. An attachment unit removably engageable with the rim of an upwardly opening liquid supply tank of a beverage dispensing machine and operating to mix together predetermined metered volumes of dry powdered beverage concentrate and water and to deliver a resulting beverage into the tank when the liquid level in the tank lowers to a predetermined low level and until the liquid level in the tank rises to a predetermined high liquid level, said unit includes an elongate vertically extending housing with vertically spaced substantially horizontal top and bottom walls, substantially vertical front, rear and side walls and a tank rim engaging flange about its perimeter, said housing is positioned atop the tank with the flange engaged on the rim of the tank, an elongate substantially horizontally extending and upwardly opening concentrate holding hopper positioned within the housing in spaced relationship with the walls thereof and having an elongate discharge duct communicating with and depending from one end portion thereof, an elongate auger within and extending longitudinally of the hopper, an electric motor within the housing drivingly coupled with the auger and operating to rotate the auger to move concentrate longitudinally in the hopper and into said duct when said motor is energized, a vertically extending mixing chamber at the bottom wall, said chamber has an upper inlet port below said duct to allow concentrate flowing from the duct to flow into the chamber and a lower discharge opening communicating with the tank, water supply means including a pressurized water service system remote from the attachment unit, an elongate nozzle with a discharge end opening into the mixing chamber and disposed to cause water issuing therefrom to mix with concentrate moved from the hopper and into the chamber and having an inlet end, an elongate water conductor connected with and between the water service system and the inlet end of the nozzle, an electrically operated on and off valve within the housing connected with and operating to start and stop the flow of water through the conductor, and a valving device connected with and operating to control the rate of flow of water through the conductor, a liquid level sensing device carried by the housing and depending into the tank and including low and high liquid level responsive switching devices, a control circuit connected with an electric power source remote from the unit and with said motor, on and off valve and said high and low liquid level responsive switching devices and operating to energize the motor and actuate the on and off valve to an open position when the low liquid level switching device operates in response to a low liquid level in the tank and operating to deenergize the motor and to actuate the on and off valve to a closed position when the high liquid level responsive switching device operates in response to a high liquid level in the tank.

2. The attachment unit set forth in claim 1 which includes a control switching means to deenergize the circuit and to put the attachment unit out of service when the supply of concentrate in the hopper is depleted to a predetermined extent, said control switching means includes mounting means pivotally supporting the hopper within the housing to allow for downward pivotal movement of a portion thereof under the weight of a supply of concentrate therein, spring means in the housing spaced from said mounting means and moving said portion of the hopper up when the weight of the supply of concentrate in the hopper is lowered to a predetermined reduced weight and a control switch connected in the circuit and mounted within the housing and engaged with a part which moves with the hopper and which operates to maintain said circuit energized when said portion of the hopper is moved and held down by the weight of concentrate therein and which operates to deenergize the circuit when the weight of concentrate in the hopper is reduced to a predetermined weight and said spring means moves said portion of the hopper up.

3. The attachment unit set forth in claim 1 wherein the on and off valve is mounted within the housing, said water conductor extends from the on and off valve through an opening in a wall of the housing and to said valving device, said valving device is at the outlet of the water service system.

4. The attachment unit set forth in claim 2 wherein the on and off valve is mounted within the housing, said water conductor extends from the on and off valve through an opening in a wall of the housing and to said valving device, said valving device is at the outlet of the water service system.

5. The attachment unit set forth in claim 1 wherein the on and off valve and the valving device are mounted within the housing and wherein said water conductor extends from within the housing through an opening therein and to said water service system.

6. The attachment unit set forth in claim 2 wherein the on and off valve and the valving device are mounted within the housing and wherein said water conductor extends from within the housing through an opening therein and to said water service system.

7. The attachment unit set forth in claim 1 wherein the on and off valve is mounted within the housing, said valving device is a manually adjustable pressure regulator mounted within the housing, the water conductor extends from within the housing through a wall thereof and to the water service system.

8. The attachment unit set forth in claim 1 which includes a control switching means to deenergize the circuit and to put the attachment unit out of service when the supply of concentrate in the hopper is depleted to a predetermined extent, said control switching means includes mounting means at and pivotally supporting one end of the hopper within the housing, spring means in the housing and engaging the hopper at a point spaced longitudinally from said one end thereof to allow pivotal movement of the hopper upward relative to said mounting means when the weight of concentrate in the hopper is lowered to a predetermined reduced weight and a control switch connected in the circuit and mounted within the housing in engagement with the hopper and operating to maintain said circuit energized when the hopper is held down relative to the mounting means and to said control switch by the weight of concentrate therein and operating to deenergize the circuit when said spring means pivots the hopper up relative to the mounting means and said control switch, said spring means is shiftable longitudinally of the hopper and is releasably held in set position longitudinally of the hopper and above said bottom wall of the housing by screw fastener means.

9. The attachment unit set forth in claim 1 which further includes gate means normally substantially closing the duct and including a valving plate normally positioned between the duct and the port and carried by a normally upwardly extending arm at one end of the hopper and clutch means pivotally coupling the arm to an end of the auger to permit the plate to move and stop in its normal position when the auger is stationary and to pivot the arm and move the plate from between the duct and port when the auger rotates.

10. An attachment unit removably engageable with the top rim of an upwardly opening liquid supply tank of a beverage dispensing machine and operating to mix together dry powdered beverage concentrate and water in predetermined metered volumes and to deliver a resulting beverage into the tank when the liquid level in the tank lowers to a predetermined low level and until the level in the tank rises to a predetermined high level therein, said attachment unit includes an elongate vertically extending housing with upper and lower portions defined by vertically spaced substantially horizontal top and bottom walls, substantially vertical front, rear and side walls with upper portions and with lower portions spaced inward from the upper portions and a support flange between said upper and lower portions of said vertical walls, said housing is positioned at the top of the tank with said support flange engaged with the rim thereof with said upper portion of the housing projecting up from the tank and with said lower portion of the housing depending into the upper portion of the tank above said high liquid level therein, an elongate horizontally extending upwardly opening concentrate holding hopper positioned within the housing in spaced relationship with the walls thereof and having a vertically extending discharge duct depending from one end portion thereof, an elongate auger extending longitudinally in the hopper, an electric motor within the housing drivingly coupled with the auger and operating to rotate the auger to move concentrate logitudinally in the hopper and to said duct when said motor is energized, vertically extending mixing chamber at the bottom wall, said chamber has an upper inlet port spaced below said duct and conducting concentrate flowing from the duct into the chamber and a lower discharge opening communicating with the supply tank, water supply means including a pressurized water service system remote from the attachment unit, an elongate nozzle with a discharge end opening into the mixing chamber and disposed to cause water issuing therefrom to mix with concentrate moved from the hopper and into the chamber and having an inlet end, an elongate water conductor connected with and between the water service system and the nozzle, an electrically operated on and off valve connected with and operating to start and stop the flow of water through the conductor and a valving device connected with and operating to control the rate of flow of water through the conductor, a liquid level sensing device carried by the housing and depending into the tank and including low and high liquid level responsive switching devices, a control circuit connected with an electric power source remote from the attachment unit and with said motor, on and off valve and said liquid level responsive switching devices and operating to energize the motor and actuate the on and off valve to an open position when the low liquid level responsive switching device operates in response to low liquid level in the tank and operates to deenergize the motor and to actuate the on and off valve to a closed position when the high liquid level responsive switching device operates in response to high liquid level in the tank.

11. The attachment unit set forth in claim 10 which includes a control switching means to deenergize the circuit and to put the attachment unit out of service when the weight of the supply of concentrate in the hopper is lowered to a predetermined weight, said control switching means includes mounting means at one end and pivotally supporting of the hopper within the housing, spring means in the housing spaced from said mounting means and yieldingly pivotally moving the hopper up relative to said mounting means when the weight of concentrate in the hopper is lowered to a predetermined reduced weight and a control switch connected in the circuit and mounted within the housing in engagement with a part which is movable within the hopper and which operates to maintain said circuit energized when the hopper is held down by the weight of concentrate therein and which operates to deenergize the circuit when said spring means moves the hopper up.

12. The attachment unit set forth in claim 10 wherein the on and off valve is mounted within the housing, said water conductor extends from the on and off valve through an opening in a wall of the housing and to said valving device, said valving device is at the outlet of the water service system.

13. The attachment unit set forth in claim 11 wherein the on and off valve is mounted withing the housing, said water conductor extends from the on and off valve through an opening in a wall of the housing and to said valving device, said valving device is at the outlet of the water service system.

14. The attachment unit set forth in claim 10 wherein the on and off valve and the valving device are mounted within the housing and wherein said water conductor extends from within the housing through an opening therein and to said water service system.

15. The attachment unit set forth in claim 11 wherein the on and off valve and the valving device are mounted within the housing and wherein said water conductor extends from within the housing through an opening therein and to said water service system.

16. The attachment unit set forth in claim 10 wherein the on and off valve is mounted within the housing, said valving device is a manually adjustable pressure regulator mounted within the housing, the water conductor extends from within the housing through a wall thereof and to the water service system.

17. The attachment unit set forth in claim 10 which includes a control switching means to deenergize the circuit and to put the attachment unit out of service when the supply of concentrate in the hopper is depleted to a predetermined extent, said control switching means includes mounting means at and pivotally supporting one end of the hopper within the housing, spring means in the housing and engaging the hopper at a point spaced longitudinally from said one end thereof to allow pivotal movement of the hopper upward relative to said mounting means when the weight of concentrate in the hopper is lowered to a predetermined reduced weight and a control switch connected in the circuit and mounted within the housing in engagement with the hopper and operating to maintain said circuit energized when the hopper is held down relative to the mounting means and to said control switch by the weight of concentrate therein and operating to deenergize the circuit when said spring means pivots the hopper up relative to the mounting means and said control switch, said spring means is shiftable longitudinally of the hopper and is releasably held in set position longitudinally of the hopper and above the bottom wall of the housing by screw fastener means.

18. The attachment unit set forth in claim 10 which further includes gate means normally substantially closing the duct and including a valving plate normally positioned between the duct and the port and carried by a normally upwardly extending arm at one end of the hopper and clutch means pivotally coupling the arm to an end of the auger to permit the plate to move and stop in its normal position when the auger is stationary and to pivot the arm and move the plate from between the duct and port when the auger rotates.

* * * * *